(12) United States Patent
Kriens

(10) Patent No.: US 9,453,647 B2
(45) Date of Patent: Sep. 27, 2016

(54) FLOOR WITH RADIANT HEAT AND METHOD OF CONSTRUCTION

(76) Inventor: Bruce Kriens, Backus, MN (US)

( * ) Notice: Subject to any disclaimer, the term of this patent is extended or adjusted under 35 U.S.C. 154(b) by 2077 days.

(21) Appl. No.: 11/640,707

(22) Filed: Dec. 18, 2006

(65) Prior Publication Data

US 2007/0295827 A1 Dec. 27, 2007

Related U.S. Application Data

(60) Provisional application No. 60/816,299, filed on Jun. 23, 2006.

(51) Int. Cl.
F24D 3/00 (2006.01)
F24D 3/14 (2006.01)

(52) U.S. Cl.
CPC ....................... F24D 3/14 (2013.01)

(58) Field of Classification Search
USPC ............ 237/69, 59, 43; 165/47, 56, 49, 171
See application file for complete search history.

(56) References Cited

U.S. PATENT DOCUMENTS

| | | | |
|---|---|---|---|
| 4,000,851 A * | 1/1977 | Heilemann | 126/587 |
| 4,185,186 A | 1/1980 | Williams | 219/213 |
| 4,290,746 A | 9/1981 | Smith | 431/328 |
| 4,529,123 A | 7/1985 | Johnson | 237/1 R |
| 4,604,054 A | 8/1986 | Smith | 431/328 |
| 4,722,681 A | 2/1988 | Smith | 431/7 |
| 4,782,889 A | 11/1988 | Bourne | 165/56 |
| 4,811,543 A * | 3/1989 | Herbst | 52/741.1 |
| 4,878,332 A | 11/1989 | Drake | 52/741 |
| 4,896,831 A | 1/1990 | Choi | 237/69 |
| 4,907,739 A | 3/1990 | Drake | 237/8 |
| 4,979,491 A | 12/1990 | DeMeritt | 126/92 B |
| 5,004,895 A | 4/1991 | Nishino et al. | 219/528 |
| 5,022,459 A * | 6/1991 | Chiles et al. | 165/11.1 |
| 5,097,893 A | 3/1992 | Trimble | 165/46 |
| 5,115,969 A * | 5/1992 | Tanaka et al. | 237/69 |
| 5,292,065 A | 3/1994 | Fiedrich | 237/69 |
| 5,579,996 A | 12/1996 | Fiedrich | 237/69 |
| 5,743,330 A | 4/1998 | Bilotta et al. | 165/183 |
| 5,788,152 A | 8/1998 | Alsberg | 237/69 |
| 5,811,758 A | 9/1998 | Choi | 219/213 |
| 5,944,089 A | 8/1999 | Roland | 165/10 |
| 6,009,612 A | 1/2000 | Fiedrich et al. | 29/432.2 |
| 6,152,377 A | 11/2000 | Fiedrich | 237/69 |
| 6,188,839 B1 | 2/2001 | Pennella | 392/435 |
| 6,503,318 B2 | 1/2003 | Pye et al. | 106/716 |
| 6,922,963 B2 | 8/2005 | Simonelli et al. | 52/480 |
| 6,969,832 B1 * | 11/2005 | Daughtry, Sr. | 219/531 |
| 6,976,337 B2 | 12/2005 | Hiraki | 52/79.1 |
| 7,010,893 B2 | 3/2006 | Bernhardt | 52/302.3 |

(Continued)

Primary Examiner — Avinash Savani
(74) Attorney, Agent, or Firm — Peter J. Ims; Westman, Champlin & Koehler, P.A.

(57) ABSTRACT

A multi-layer heated floor includes insulating layer having a bottom surface positioned on a ground level and a top surface. Heating conduits are positioned above the top surface of the insulating layer and a base material layer is positioned on the insulating layer where the base material layer encases the conduits. The base material comprises a compactible material and wherein the base layer comprises a top surface. A concrete layer is positioned on the top surface of the base layer wherein heat from the heating conduit passes through the base layer and wherein the base layer distributes the heat. The heat enters the concrete slab through a bottom surface through a top surface of the concrete layer to heat the space above the floor.

11 Claims, 5 Drawing Sheets

(56) References Cited

U.S. PATENT DOCUMENTS

| | | | |
|---|---|---|---|
| 2003/0218075 A1 | 11/2003 | Muir | 237/69 |
| 2005/0031832 A1 | 2/2005 | Kannankeril et al. | 428/178 |
| 2005/0103776 A1 | 5/2005 | Nielson et al. | 219/553 |
| 2006/0000184 A1 | 1/2006 | Kannankeril et al. | 52/741.1 |

* cited by examiner

FLOOR WITH RADIANT HEAT AND METHOD OF CONSTRUCTION

CROSS-REFERENCE TO RELATED APPLICATION

The present application claims the benefit of U.S. provisional patent application Ser. No. 60/816,299, filed Jun. 23, 2006, the content of which is hereby incorporated by reference in its entirety.

BACKGROUND OF THE INVENTION

The present invention relates to a floor for a building and a method of constructing the floor. More particularly, the present invention relates a floor having a radiant heat system and a concrete slab and a method of constructing the floor containing the radiant heat system and the concrete slab.

There are many large buildings such as home improvement stores and warehouse stores that utilize a cement slab as a floor for the space. Typically, a forced air heating system is utilized to heat the building. However, utilizing a forced air system to heat a large space can make controlling the temperature difficult where the temperature fluctuates.

In many instances, the building owner would prefer to use a radiant heat system that is encased within the cement slab because a radiant heating system provides a more consistent ambient temperature. However, the costs associated with installing the radiant heat system into a cement slab can be expensive when compared to a floor that is constructed without a radiant heat system.

To install a radiant heat system in a cement slab, tubes that contain a heating medium, such as a hot fluid or liquid, are positioned at selected intervals along the area to be covered by the cement slab. The cement slab is then typically poured using manual labor, instead of heavy equipment, to prevent the tubes from being crushed. The use of manual labor instead of heavy equipment can cause the cost of cement slabs containing a radiant heat system to escalate to a point such that the cost can be an impediment to installing a cement floor with a radiant heat system.

Further, it is difficult to remodel a building having a radiant heat system encased within the cement slab or modify the cement slab as the modification to the cement slab may damage the tubing; requiring an expensive repair. In many instances, if a radiant heat system is encased within the cement slab, the owner will refrain from performing the desired remodeling to save the costs associated with having to repair the radiant heat system.

SUMMARY OF THE INVENTION

The present invention includes a multi-layer heated floor comprising an insulating layer having a bottom surface positioned on a ground level and a top surface. Heating tubes are positioned above the top surface of the insulating layer and a base layer is positioned on the insulating layer where the base layer encases the tubes. The base layer comprises a compactible material and wherein the base layer comprises a top surface. A concrete layer is positioned onto the top surface of the base layer wherein heat from the heating tubes pass through the base layer and wherein the base layer distributes the heat into the concrete slab and wherein the heat passes through a top surface of the concrete layer to heat the space above the floor.

DETAILED DESCRIPTION OF ILLUSTRATIVE EMBODIMENTS

Figure 1:
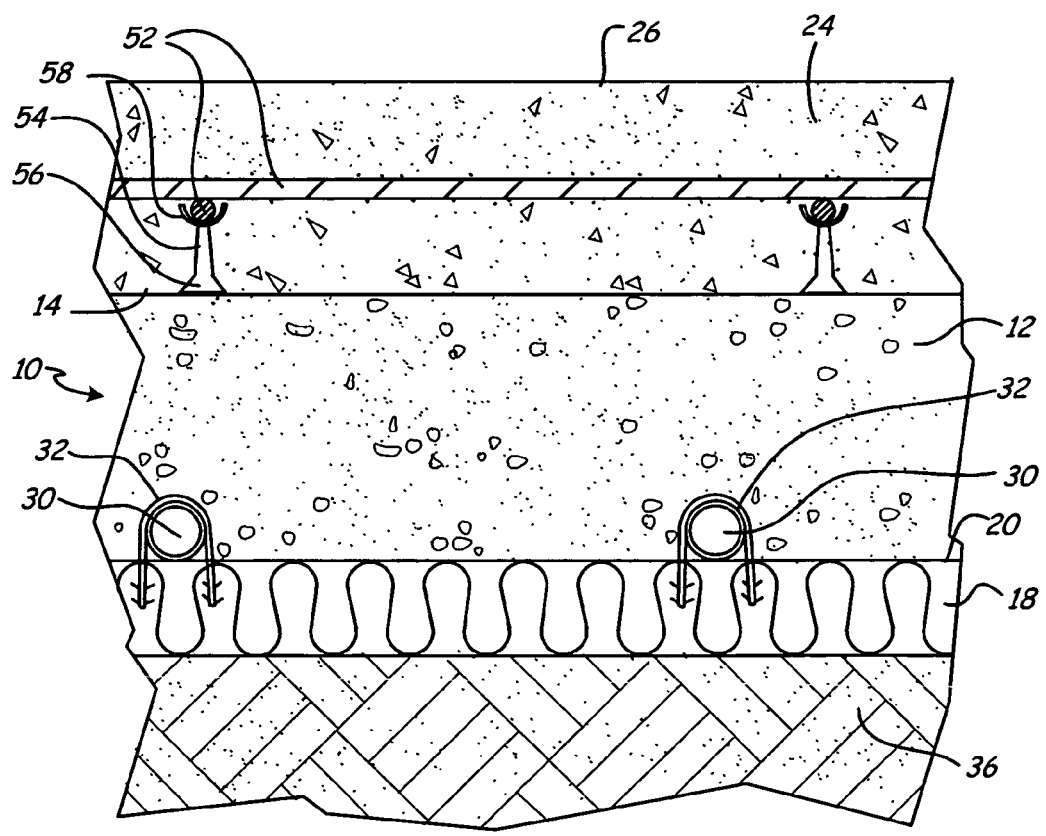
FIG. 1 is a sectional view of the floor of the present invention.

A floor heated with radiant heat is generally depicted in FIG. 1 at 10. The floor 10 includes a base layer 12 positioned between an insulating layer 18 and a concrete slab 24 where a plurality heating tubes 30 are encased within the base layer 12. The construction of the floor 10 provides the benefit of evenly distributing radiant heat through a top surface 26 of the concrete slab 24 as well as providing an inexpensive and efficient method of constructing the floor 10.

Referring to FIGS. 1-4, prior to preparing a ground surface 36 as foundation for the floor 10, utility connections 40 such as electricity, water and sewer are installed into a space 42. Typically, the utility connections 40 are positioned within the space 42 such that the connections extend upwardly into the space 42 from the ground 36. The ground 36 is then prepared as the foundation for the floor 10.

Figure 2:
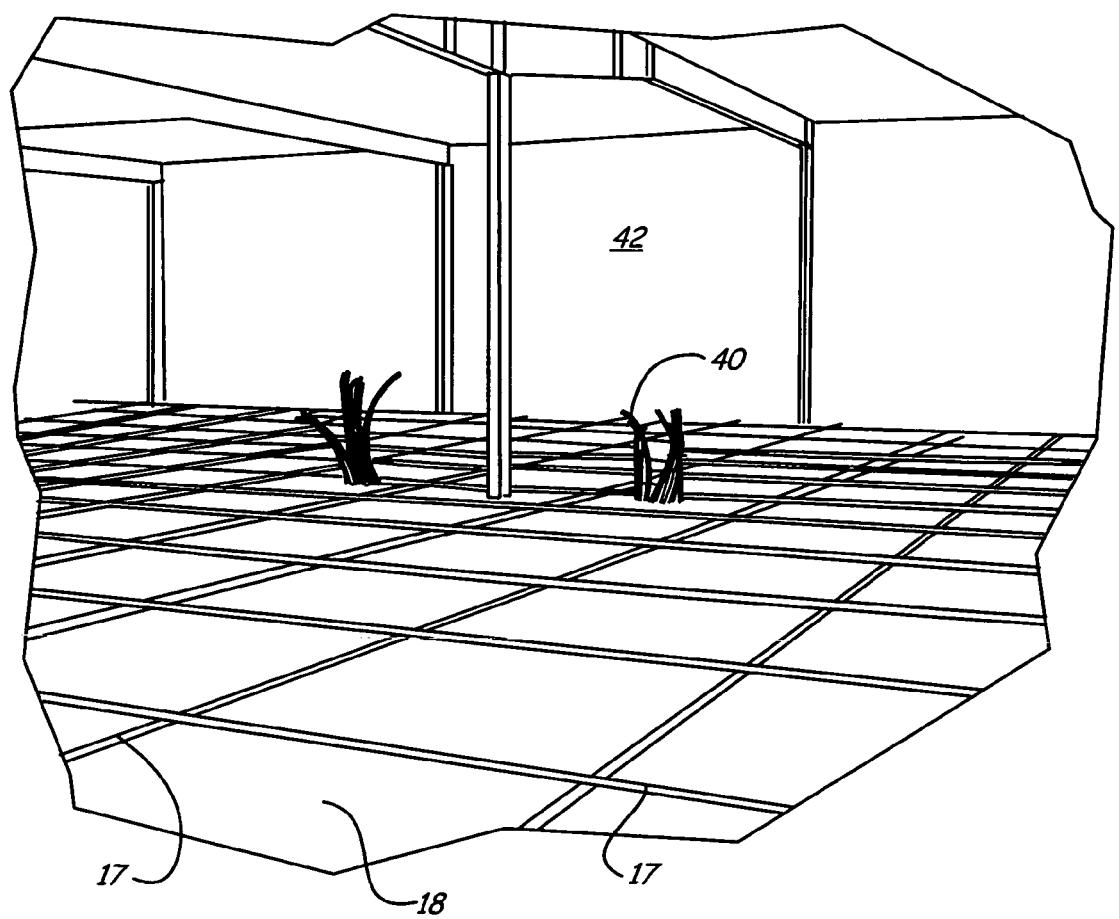
FIG. 2 is a partial perspective view of an area for a floor having an insulating layer positioned thereon.

After the ground 36 has been prepared, the insulating layer 18 is positioned on the typically leveled ground 36. Typically, the insulating layer 18 is made up of sheets of a hard rigid foam. The seams of the hard rigid insulating layer 18 are joined together with tape 17 to prevent the sections from separating as best illustrated in FIG. 2.

The insulating layer 18 is typically about 2 inches thick. However, the thickness of the insulative layer 18 may also range from between about 1 and 4 inches and be of any suitable insulating material.

Figure 3:
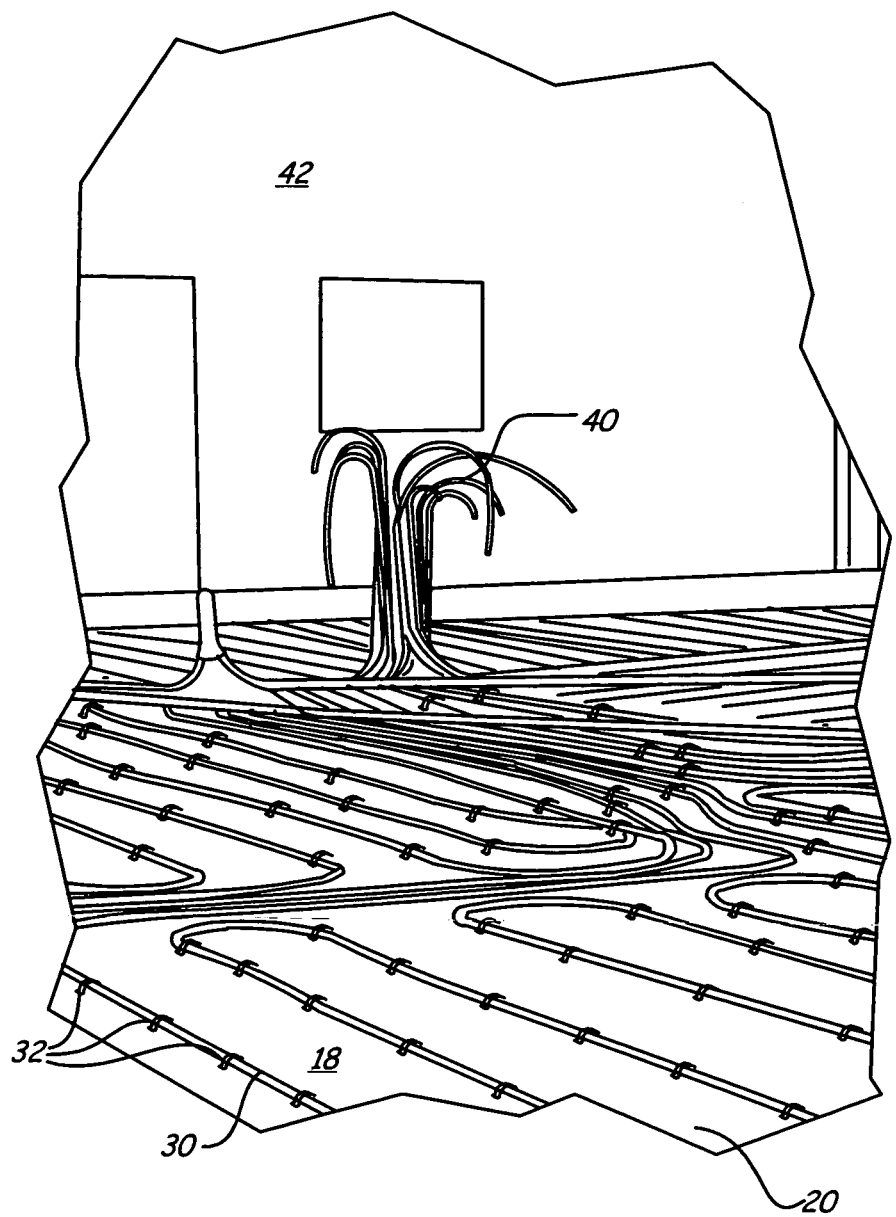
FIG. 3 is a partial perspective view of an area for a floor having an insulative layer with heating tubes attached thereto.

Referring to FIGS. 1 and 3, with the insulating layer 18 installed, the tubing 30 is positioned at selected intervals along a top surface 20 of the insulating layer 18. The tubing 30 is typically fastened to the top surface 20 of the insulating layer 18 with plastic staples 32. However, other attaching mechanisms could also be utilized to attach the tubing to the top layer of the insulation. Further, while typical, it is not necessary to secure the tubing 30 to the insulating layer 18.

Figure 4:
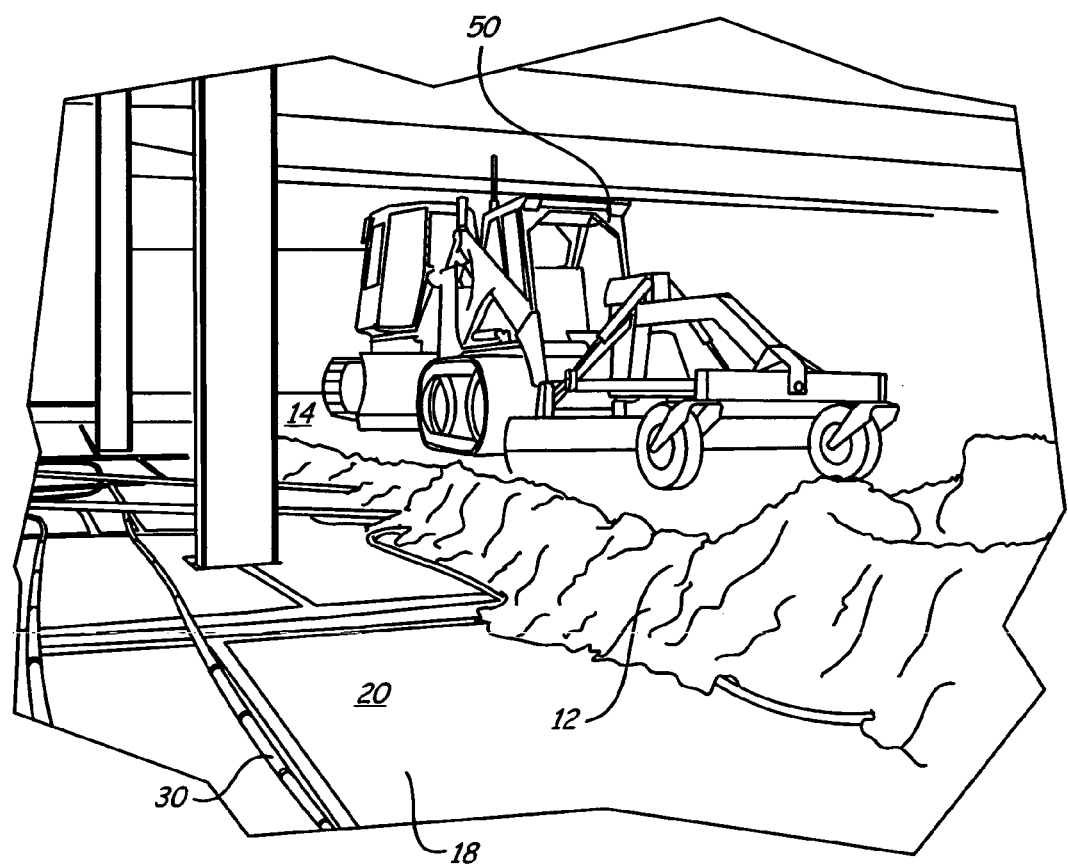
FIG. 4 is a partial perspective view of a building having a base material positioned on top of the insulating layer and encasing the heating tubes.

Referring to FIGS. 1 and 4, with the tubing 30 installed, the base layer 12 is positioned on the top surface 20 of the insulating layer 18. The base layer 12 is typically a Class I road construction material consisting of a sand and clay mixture. The base layer 12 is typically positioned onto the top surface 20 of the insulating layer 18 while encasing the tubing 30 from an edge or corner of the building. As the base layer 12 is positioned on top of the insulating layer 12 and encases the tubing 30, heavy equipment 50 can be driven over the base layer 18 to distribute, level and compact the base material.

With the base layer 12 encasing the tubing 30 and distributing the weight of the heavy equipment 50, the tubing 30 is not damaged as the base layer 12 is constructed, compressed and leveled with heavy equipment. Because the heavy equipment 50 can be utilized to construct the base layer 12 and pour the concrete layer 24, very accurate equipment such as a Somero Laser Screed® screeding machine may be utilized to precisely level the top surface 26 of the concrete layer.

While a Class I road material is typically utilized to construct the base layer 12, other materials can also be utilized to construct the base layer 12. The base layer 12 is typically about 2 and 12 inches in thickness, and more typically between about 4 and 8 inches in thickness.

Referring to FIG. 1, with the base material 12 compacted and leveled, rebar 52 is suspended above a top surface 14 of the base material 12 utilizing rebar chairs 54 which are typically about 4 inches tall. Each rebar chair 54 typically includes a base 56 that is supported by the top surface 14 of the base layer 12 to provide stability to the rebar chair 54 and an arcuate channel 58 at the other end that accepts the rebar 56. The rebar 52 typically positioned in a grid pattern along the entire surface area of the floor 10.

With the rebar 52 in the selected position, the concrete 24 is poured to a selected thickness that encases the rebar 52. The concrete is leveled and smoothed and allowed to set for a selected amount of time such that the concrete hardens and dries. The concrete slab 24 is typically between about 2 and 8 inches in thickness and more typically about 5 inches in thickness.

The advantages of the floor 10 of the present invention include that the radiant heated floor 10 is much easier to install utilizing the heavy equipment 50 than utilizing manual labor and light equipment such as wheelbarrows and shovels. Utilizing the heavy equipment 50 decreases the cost of construction of the floor 10. Further, because the heavy equipment is utilized, the quality of the installation is increased because there is more precision in leveling the base layer 12 and the concrete slab 24.

Figure 5:
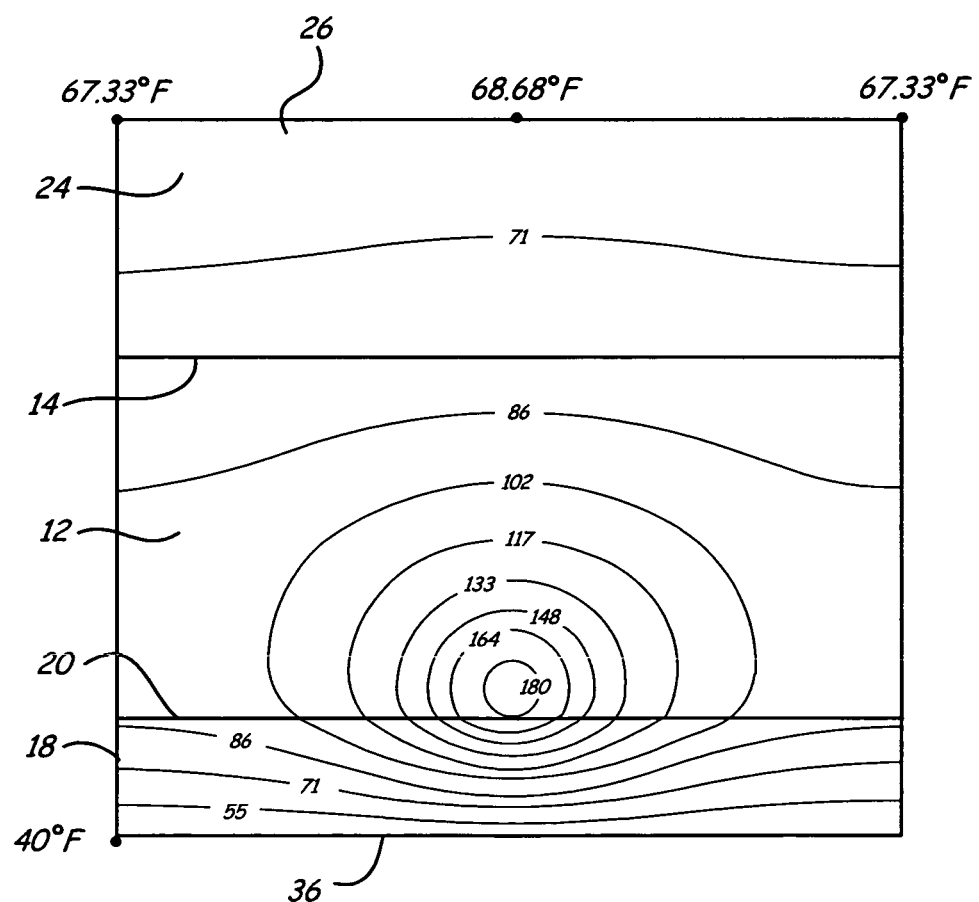
FIG. 5 is a graph of temperature distribution of a vertical cross section of the floor of the present invention.

The construction of the floor 10 having radiant tubes encased in the base layer 12 also provides for a better distribution of heat through the floor surface 26. Referring to FIG. 5, the temperature of the floor surface 26 is relatively consistent and there are no hot spots on the top surface 26 of the concrete slab 24 where the surface temperature of the concrete is typically in the range between about 60° F. and 80° F. In a conventional radiant heat system utilized in a concrete floor, hot spots as high as 120° and cold spots as low as 65° F. may be present.

The base layer 12 also acts as a heat sink which stores a significant amount of heat, allowing the owner to utilize off-peak heating in the building. Utilizing off peak heating results in an energy cost savings to the building owner where electric boilers could be utilized to heat fluid or liquid such as oil or water during off peak times to heat the building.

The base layer 12 also provides additional advantages in the event that maintenance, additions to the building or floor or improvements to the concrete floor are required. Because the tubing 30 is encased within the base layer 12, the concrete layer 24 can be broken up and remodeled without affecting the heating system. Similarly, additions and modifications to the concrete floor 24 may be easily completed because the heating tubes 30 are not contained within the concrete slab 24. Therefore, the floor 10 of the present invention provides additional flexibility that would not be normally obtainable in a typical concrete floor having radiant heat.

Although the present invention has been described with reference to preferred embodiments, workers skilled in the art will recognize that changes may be made in form and detail without departing from the spirit and scope of the invention.

What is claimed is:

1. A multi-layer heated floor comprising:
   a foam layer having insulating properties, the foam layer comprising a bottom surface positioned on a ground level and a top surface;
   a plurality of heating tubes positioned directly on the top surface of the insulating layer;
   a base material layer positioned on the insulating layer and encasing the heating tubes wherein the base layer comprises a compactable material and wherein the base material layer comprises a top surface; and
   a concrete layer positioned on and supported by the top surface of the base layer wherein heat from the heating conduits passes into the base layer and wherein the base layer distributes the heat through the base layer and the heat enters the concrete layer through a bottom surface and exits through a top surface of the concrete layer to heat a space above the floor.

2. The floor of claim 1 and wherein the base material comprises a mixture of sand and clay.

3. The floor of claim 1 and wherein the base material comprises sand.

4. The floor of claim 1 and wherein the base material has a thickness of between about 2 inches and about 12 inches.

5. The floor of claim 1 and wherein the base material has a thickness of between about 4 inches and about 8 inches.

6. The floor of claim 1 and wherein the heating tubes are secured to the top surface of the insulating layer.

7. The floor of claim 1 and wherein the foam layer comprises a thickness of about 1 inches and about 4 inches.

8. The floor of claim 1 and wherein the heating tubes comprise hot water heating tubes.

9. The floor of claim 1 and wherein the heating tubes are spaced apart a selected distance across the top surface of the insulating layer.

10. The floor of claim 1 and wherein the concrete layer has a thickness of between about 2 inches and about 8 inches.

11. The floor of claim 1 and further comprising rebar within the concrete layer.

\* \* \* \* \*